UNITED STATES PATENT OFFICE.

DAVID BACHRACH, OF BALTIMORE, MARYLAND.

NITROCELLULOSE.

SPECIFICATION forming part of Letters Patent No. 692,102, dated January 28, 1902.

Application filed April 4, 1901. Serial No. 54,285. (No specimens.)

*To all whom it may concern:*

Be it known that I, DAVID BACHRACH, a citizen of the United States, residing at the city of Baltimore, in the State of Maryland, have invented new and useful Improvements in Nitrocellulose and Similar Substances, fully described and represented in the following specification, forming a part of the same.

This invention relates to improvements in nitrocellulose and similar compounds, the object of the present invention being to provide an acid and chemical proof compound of this character which will be useful for vessels and apparatus coming in contact with corrosive chemicals. The form of nitrocellulose known as "celluloid," "pyrallin," &c., adapts itself especially to molding photographic trays and chemical apparatus; but a prolonged contact with acids and strong alkalies disintegrates the compound. To overcome this objection, none of the additions in the way of pigments have so far been of practical effect. I have discovered that an addition of the carbons known as "graphite," "plumbago," &c., or bitumen, or a combination of these, reduced to an impalpable powder or as finely pulverized as possible when combined with the compounds named in the process of manufacture protects and covers the particles so intimately that the corrosive substances find no unprotected portion to act upon, and the process of disintegration is effectually prevented.

Add to the usual quantities of pyroxylin and camphor about ten per cent. or more of graphite or bitumen, the two substances I have found specially adapted for this purpose, or both may be used in quantities to suit special purposes. The bitumen may be preferred where more pliability and textile strength are desired, as a slight application of heat where this is used welds the compound and makes it less brittle; but for perfectly clean and repellent surfaces to give the greatest resistance to corrosive chemicals the graphite alone is preferable. When both are employed, equal quantities of each give good results. The proportions may be varied to suit special purposes. When used in conjunction with my process for making the same non-combustible where a large quantity of pigment is incorporated with the mass, it is advantageous to employ bitumen in connection with graphite in equal proportions. This compound may also be used in a semiliquid state to coat all sorts of surfaces.

What I claim, and desire to protect by Letters Patent, is—

A nitrocellulose or similar compound protected against corrosive chemical action by the addition of graphite and bitumen, substantially as and for the purposes described.

In testimony whereof I have hereunto set my hand in the presence of two subscribing witnesses.

DAVID BACHRACH.

Witnesses:
   MARY E. HANNA,
   WILLIAM WRIGHT.